United States Patent
Wilding

(10) Patent No.: US 10,567,475 B2
(45) Date of Patent: **\*Feb. 18, 2020**

(54) HIGH-SPEED TRACE FUNCTIONALITY IN AN ON-DEMAND SERVICES ENVIRONMENT

(71) Applicant: salesforce.com, inc., San Francisco, CA (US)

(72) Inventor: Mark Wilding, Issaquah, WA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,622

(22) Filed: Jun. 4, 2018

(65) Prior Publication Data

US 2018/0288132 A1 Oct. 4, 2018

Related U.S. Application Data

(63) Continuation of application No. 15/013,760, filed on Feb. 2, 2016, now Pat. No. 9,992,264.

(51) Int. Cl.
| | |
|---|---|
| *H04L 29/08* | (2006.01) |
| *H04L 12/863* | (2013.01) |
| *H04L 12/26* | (2006.01) |
| *G06F 11/36* | (2006.01) |
| *H04L 12/861* | (2013.01) |

(52) U.S. Cl.
CPC .......... *H04L 67/06* (2013.01); *G06F 11/3636* (2013.01); *H04L 43/04* (2013.01); *H04L 47/622* (2013.01); *H04L 47/624* (2013.01); *H04L 49/9036* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

OTHER PUBLICATIONS

Corrected Notice of Allowance for U.S. Appl. No. 15/013,760 dated Feb. 9, 2018, 4 pages.

(Continued)

*Primary Examiner* — Natisha D Cox
(74) *Attorney, Agent, or Firm* — Jaffery, Watson, Mendonsa & Hamilton, LLP

(57) ABSTRACT

Techniques and architectures to provide trace functionality. Trace record data is received from a plurality of client threads executed by one or more processors. The trace record data is stored in a plurality of chunks maintained in an in-use list. The in-use list has a chunk for individual use by the corresponding client threads. Chunks in the in-use list are moved to a completed queue when a chunk in the in-use list is substantially full. A chunk from a free list is placed in the in-use list to replace removed chunks. The chunks from the completed queue are stored in at least one memory device.

24 Claims, 5 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 9,742,866 B2 * | 8/2017 | Shribman ............... H04L 67/06 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2010/0312976 A1 | 12/2010 | Kaneda |
| 2015/0347271 A1 * | 12/2015 | Payne ............... G06F 11/3636 717/128 |
| 2017/0132111 A1 | 5/2017 | Sivalingam et al. |
| 2018/0046678 A1 * | 2/2018 | Wilding ............ G06F 16/2453 |

OTHER PUBLICATIONS

Notice of Allowance for U.S. Appl. No. 15/013,760 dated Jan. 16, 2018, 7 pages.

* cited by examiner

HIGH-SPEED TRACE FUNCTIONALITY IN AN ON-DEMAND SERVICES ENVIRONMENT

CLAIM OF PRIORITY

This application is a continuation of U.S. patent application Ser. No. 15/013,760, entitled "HIGH-SPEED TRACE FUNCTIONALITY IN AN ON-DEMAND SERVICES ENVIRONMENT," filed Feb. 2, 2016, now U.S. Pat. No. 9,992,264 issued Jun. 5, 2018, the contents of which are incorporated herein by reference in their entirety.

TECHNICAL FIELD

Embodiments relate to techniques for providing trace functionality. More particularly, embodiments relate to techniques for providing lightweight, high-speed trace functionality in complex computing environment.

BACKGROUND

Development and management of computing environments often result in incorrect or unexpected results. Information gathered by a trace can provide valuable information that can be utilized to resolve the incurred or unexpected results. Trace records provide information associated with operations performed within the computing environment and can be important debugging and troubleshooting tools. However, current trace architectures may be inefficient.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Trace data management as described herein is performed utilizing "chunks" of data having a consistent size, format and/or handling. A chunk is a contiguous block of shared memory that is allocated to a process or thread. The chunk is owned by the process/thread until the chunk is released or until it is traded for a new chunk. This is described in greater detail in, for example, FIG. 2. The size of a chunk is a balance between timeliness and performance. The larger the chunk, the less contention there will be on the chunk exchange mechanism (e.g. when used by thousands of processes/threads). However, large chunks will be exchanged less frequently meaning the contained trace records will typically be older.

Figure 1:
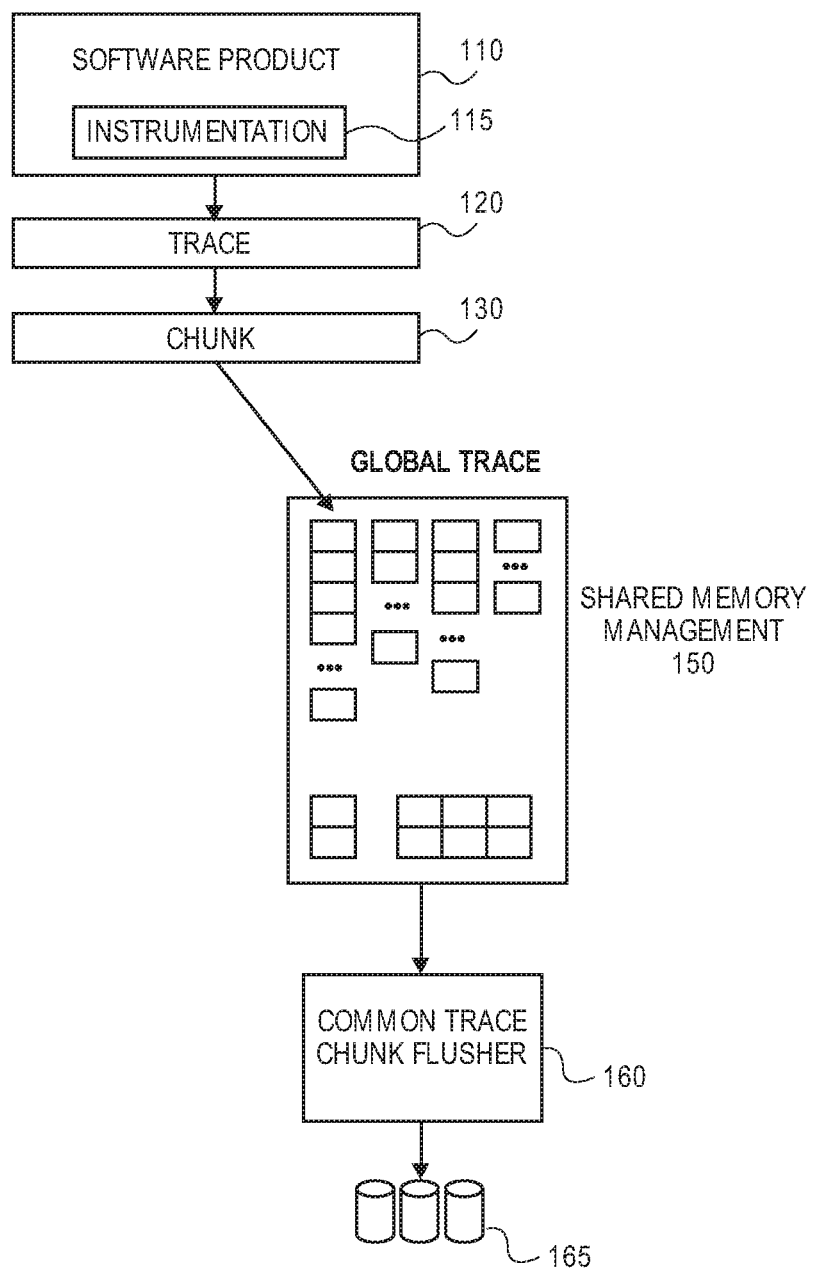
FIG. 1 is a block diagram of one embodiment of a high-speed trace architecture.

FIG. 1 is a block diagram of one embodiment of a high-speed trace architecture. The high-speed trace architecture may be provided, for example, within an on-demand services, or a database environment. In one embodiment, software product 110 provides both filtering (e.g., which instrumentation points are active) and routing (e.g., which serviceability features are active) for instrumentation points.

In one embodiment, when the trace functionality is enabled, the instrumentation points (and associated data) are routed to trace agent 120. In one embodiment, trace agent 120 provides trace records management. In one embodiment, trace records contain details captured by instrumentation interface 115 within, for example, software product 110. In one embodiment, many trace records for a thread or process are stored in the chunks, which are stored in trace memory (e.g., when full) that is managed at the chunk level by chunk agent 130. Chunk management, various embodiments of which are described herein, provide the ability to efficiently capture and process trace records and can result in a high concurrency and can scale well. In one embodiment, trace record management within chunk agent 130 only operates on a single chunk at a time.

In one embodiment, the trace functionality described herein is provided within an on-demand services environment. In one embodiment, the on-demand services environment is a multitenant environment that includes one or more shared databases. Various embodiments for multitenant on-demand services environments are described in greater detail below.

In one embodiment, a trace generates trace information for all operates within the computing environment. In one embodiment, one or more service process/thread (illustrated more in FIG. 2) allocate an array of chunks for corresponding tenants in shared memory and shared memory management agent 150 manages the chunks. One embodiment of management of chunks for trace is described in greater detail in FIG. 2. Periodically, common trace chunk flusher 160 flushes the chunks to disk 165.

In one embodiment, chunk data is densely packed. In one embodiment, a chunk header includes a record type that indicates the type of records stored within the chunk. In one embodiment, the header type defines the type of data in the chunk. If a context change or a chunk type change occurs, a context change can be included in the chunks to indicate that subsequent records are of a new type and/or context.

Figure 2:
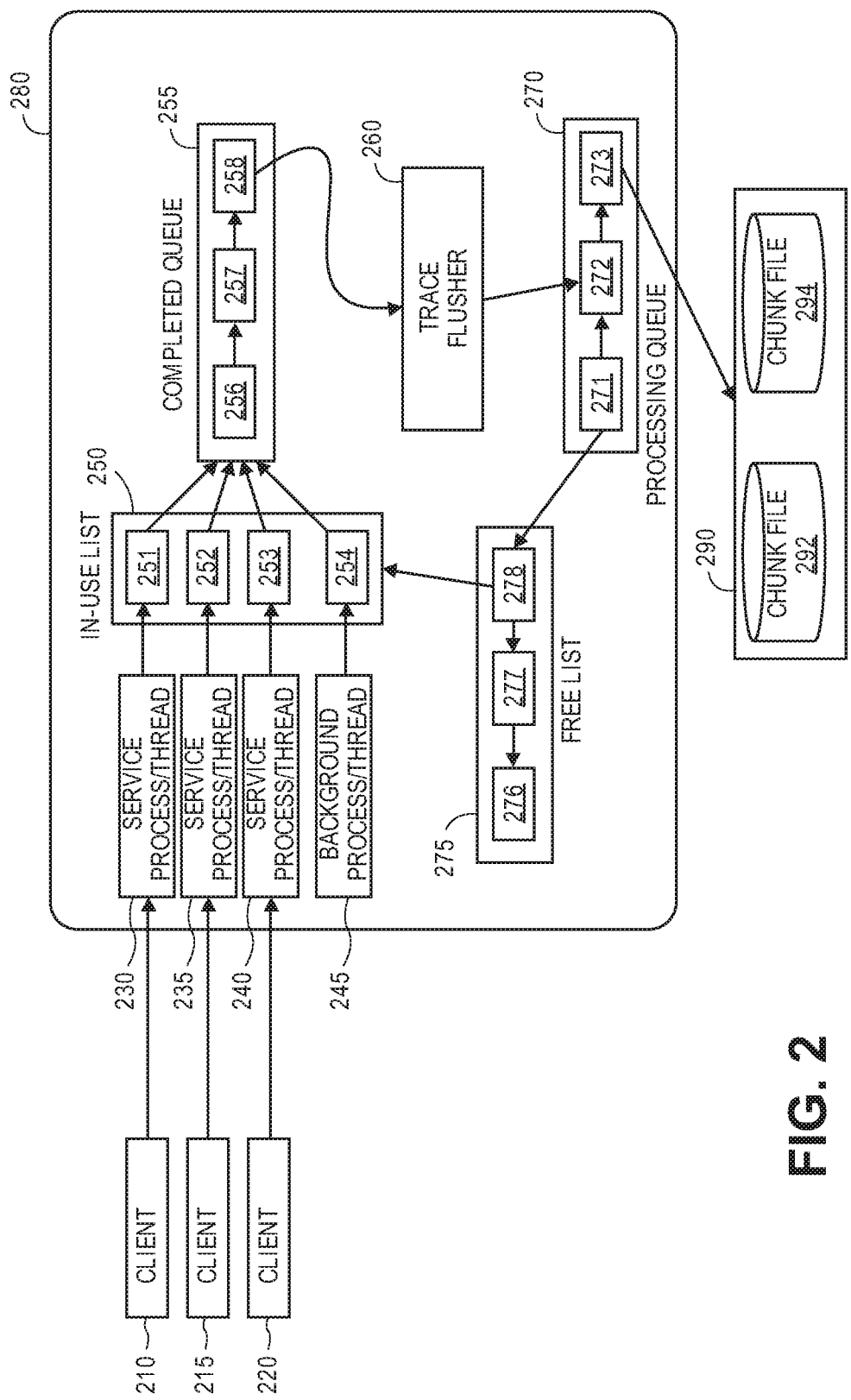
FIG. 2 is a block diagram of one embodiment of a trace mechanism.

FIG. 2 is a block diagram of one embodiment of a trace mechanism. The service processes/threads discussed herein are engines and/or logic that operates one or more processes or one or more threads that are responsible for servicing request from, for example, client entities. In one embodiment, the service processes/threads can service requests for more than one client (or tenant in a multitenant environment) over time. In one embodiment, context information can be included within a chunk to indicate a mid-chunk change in context.

In one embodiment, the trace allows any or all database server processes to use chunk management that uses chunks from shared memory. In one embodiment, chunk management utilizes a set of lists (e.g., in-use list 250, free list 275) and queues (e.g., completed queue 255, processing queue 270) to manage the chunks. In one embodiment, all chunks are the same size (e.g., 16 kb, 32 kb, 128 kb).

The example of FIG. 2 illustrates three clients/tenants (e.g., client 210, client 215, client 220), which represent, for example, tenants/organizations/clients within a multitenant computing environment. In alternate embodiments, the clients can be suborganizations/subgroups or even individual computing devices (e.g., laptop computer, tablet, smartphone, wearable device). The example of FIG. 2 illustrates three clients; however, any number of clients can be supported.

In one embodiment, within trace engine 280, each client has a corresponding service process/thread (e.g., client 210→service process/thread 230, client 215→service process/thread 235, client 220→service process/thread 240). In one embodiment, one or more background processes/threads 245 can also provide trace information.

In one embodiment, chunks (e.g., 276, 277, 278) start in free list 275 and are moved by trace engine 280 to in-use list 250. In one embodiment, chunks are moved from free list 275 to in-use list 250 under latch. In one embodiment, if free list 275 is empty (i.e., trace flusher 260 is unable to keep up), trace engine 280 can reuse current chunks by overwriting recent trace records. In one embodiment, trace flushing is limited by storage speeds or memory speeds (e.g., DRAM speed). Alternatively, the process can be stalled until one or more chunks are free, or a chunk can be pulled from completed queue 255.

In one embodiment, in-use list 250 includes one chunk of memory for each service process/thread/daemon (e.g., service process/thread 230→chunk 251, service process/thread 235→chunk 252, service process/thread 240→chunk 253, background processes/thread 245→chunk 254) providing trace information. When a chunk in in-use list 250 is full, the full chunk is moved to completed queue 255. Completed queue 255 stores chunks (e.g., 256, 257, 258) that are sufficiently filled with trace information until they are processed by trace flusher 260.

In one embodiment, trace flusher 260 operates to move trace data from chunks in completed queue 255 to disk/external memory/database 290. In one embodiment, as part of the process of moving trace data from chunks in completed queue 255 to database 290, trace flusher 260 moves chunks to be processed (e.g., 271, 272, 273) to processing queue 270. Trace data from processing queue can be combined and written to database 290. Chunks that have been processed are added to free list 275 and can be used again as described above.

In one embodiment, memory for trace is allocated upon startup of trace engine 280. In one embodiment, three chunks are allocated for each possible engine process. In alternate embodiments, a different number of chunks can be allocated, for example, two chunks per possible process, a set number of chunks, a variable number of chunks based on priority designations, etc. In one embodiment, trace records are four bytes each and trace flusher 260 can write hundreds (e.g., 400) of megabytes of data per second, which supports hundreds of millions of trace records per second. If trace chunks are written to solid state drives (SSDs), the number can be even higher. In alternate embodiments, different sizes and/or throughput parameters can also be supported.

In one embodiment, one or more of the following alternative chunk allocation schemes can be utilized. Blocks can be borrowed from a block cache for trace data as needed. In one embodiment, the block cache is a general shared memory allocator through which blocks can be borrowed to create additional chunks. In one embodiment, this can be accomplished on the fly. In one embodiment, enough memory can be allocated to support a large in-memory trace.

In one embodiment, trace engine 280 writes a set of chunk files to a trace directory. The on-disk space can be set when trace is enabled and trace engine 280 can manage a set of chunk files to stay within the allocated disk space.

In one embodiment, flushing trace data includes one or more of the following: 1) make a copy of the current high water mark for each in-use chunk; 2) write remaining chunks from the completed queue and processing queue to disk; and 3) iterate over each of the in-use chunks and write them to disk as well. In one embodiment, the engine processes can continue to use the in-use chunks while trace flusher 260 is writing chunks out. In one embodiment, engine processes can fill chunks past the high water mark while the chunk is being written to disk up to the high water mark. In one embodiment, engine processes can try to trade in-use full chunks while the in-use chunks are being flushed to disk.

In one embodiment, chunk file formatting is accomplished in two parts. In one embodiment, each chunk is read in order from the chunk file. Chunk sequencing is performed as a first pass over the chunk files to find the correct order of chunks across all processes and chunk files. Record iteration is performed as a second pass that attempts to order trace records. In one embodiment, utilizing time stamps, each trace record has a high-resolution time stamp that can be used to determine ordering.

In one embodiment, correlation trace points can be utilized that indicate some type of coordination between processes. This can support correlation without use of time stamps. In one embodiment, trace records are formatted based on the type of trace, for example, code trace, event trace, SQL trace, etc.

In one embodiment, a trace record includes a header, a timestamp and event fields as described above. In one embodiment, when a trace record includes data payloads, each data item has a corresponding data descriptor. In one embodiment, trace records can have an unlimited number of data items and the descriptors include a "more" field indicating there are more following data items. The last data item can have the "more" field set to false.

Various techniques can be utilized to increase trace density. Higher density increases the amount of history that can be kept in memory for an in-memory trace. Increased density reduces the chunk trade-in frequency, which reduces potential contention. Higher density reduces the rate of I/O operations when writing trace chunks to disk, which is a potential bottleneck. Higher density also decreases file sizes. Thus, increased density provides several advantages. In various embodiments, one or more of the mechanisms described below can be utilized to increase trace density.

In one embodiment, bit fields are utilized for trace records to reduce the required space. In one embodiment, to improve trace record density, trace fields and records can be packed next to each other ignoring alignment. In one embodiment, only the fields required for the corresponding trace are included in the trace records. That is fields such as the event descriptor, for example, are only included in a trace record when needed. In one embodiment, code path variables are shrunk to 32 bits when possible; however, other sizes can also be supported. Trace files can also be compressed using compression techniques on trace files.

In one embodiment, the trace engine process gets a single trace chunk at a time and that chunk is reserved for as long as the process needs to fill it. Chunks are filled with trace records and eventually traded for a new chunk. Filled chunks are either reused (e.g., for in-memory trace) or are written to disk by the trace flusher. In one embodiment, the first part of the trace chunk includes a chunk "stamp" that contains information about the chunk including, for example, the size of the chunk stamp, the size of the chunk, a high water mark for the chunk, a sequence number, an initialization time and/or a seal time. Other and/or different information can also be included.

In one embodiment, the chunk stamp can be used to store (e.g., page URI) information such as, for example, a process identifier (pid) or application context information. In one embodiment, all trace points within the chunk are under the context of the chunk unless the context is redefined via, for example, a special context trace point. For example, as long as the application context is not reset, the application context defined in the chunk header can be considered the value for all trace points within the chunk. This can help with trace record density because context information can be set once in the chunk for all trace points. In one embodiment, the chunk size is configurable.

Figure 3:
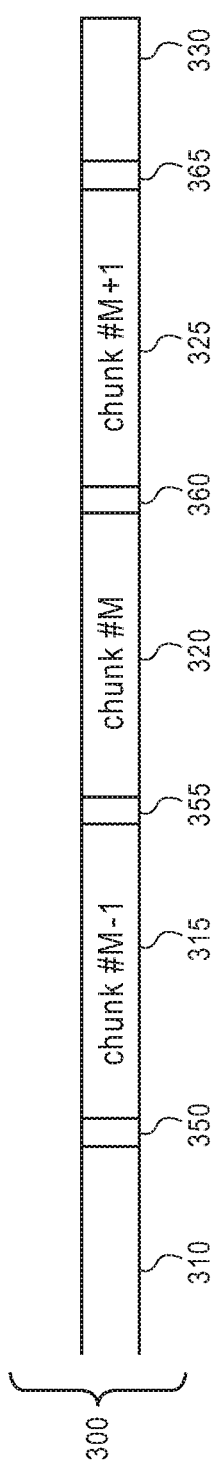
FIG. 3 illustrates an example sequence of chunks.

FIG. 3 illustrates an example sequence of chunks. In one embodiment, each chunk (e.g., 310, 315, 320, 325, 330) has an associated sequence number that can be part of a chunk header (e.g., 350, 355, 360, 365) that can be used to properly order chunks. In one embodiment, the sequence number is an ever-increasing number for each process. This can be used to provide a "stream" of chunks (300) corresponding to a trace session for a particular trace engine process.

Figure 4:
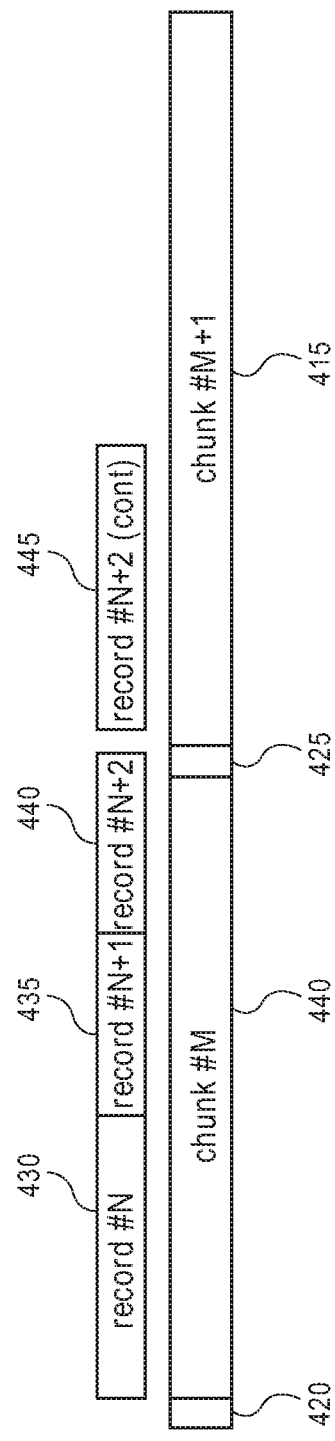
FIG. 4 illustrates a sequence of chunks that can be used to capture large data items.

FIG. 4 illustrates a sequence of chunks that can be used to capture large data items. The example of FIG. 4 is one in which a record spans two chunks; however, a record may span any number of chunks. As discussed above, each chunk (e.g., 410, 415) has an associated header (e.g., 420, 425). In one embodiment, records are placed in the chunks sequentially. Some records (e.g., 430, 435) fit completely within a chunk. In one embodiment, if there is not enough room to store a record, a first portion of the record (e.g., 440) is stored in a current chunk (e.g., 400) and the remainder of the record (e.g., 445) is stored in the next chunk (e.g., 415).

In one embodiment, trace record space is calculated to determine if the entire record can fit in the current chunk. If the record will fit in the current chunk, the record is written to the chunk. If the record will not fit in the current chunk, the portion of the record that will fit in the current chunk is written and the remainder of the record is maintained until a new chunk is acquired. The remaining portion of the record is written to the new chunk.

When acquiring a new chunk, the trace engine determines whether the trace is a session trace or a trace. In one embodiment, chunks for a session trace are maintained in a private memory. In one embodiment, chunks are allocated in round-robin order with older chunks being eventually overwritten by newer chunks.

In one embodiment, chunks for a trace are maintained in a shared memory. One embodiment, of trace chunk management is described above with respect to FIG. 2. In one embodiment, all chunks start on the free list. Single chunks are moved from the free list to the used list (one at a time). Once a chunk is full of records, it is moved (one at a time) to the completed queue. The trace daemon (or other entity) moves chunks from the completed queue to the processing queue in one operation. Chunks are then moved from the processing queue to the free list where they can be used again for trace records. In one embodiment, this can be done as a single batch operation, which can provide reduced contention.

In one embodiment, one or more iterators are used to read from trace files. In one embodiment, the topmost iterator layer is the record iterator, which operates to properly sequence records in the correct order regardless of the chunk in which they are stored. The second iterator layer is for chunks. Chunks can come from a session trace file, from memory, or from a trace file. The chunk iterator operates to properly sequence chunks and return them in the correct order regardless of where or how they were stored.

In one embodiment, the trace mechanisms described herein can be provided within an on-demand services environment that can include, one or more shared databases. The on-demand services environment can support multiple tenants, each having access to their own data, but not to data of other tenants. The trace mechanisms described herein can operate, for example, to provide session trace functionality to individual tenants and/or trace functionality to the multitenant portions (e.g., a database) of the environment. Various embodiments of an on-demand services environment are described in detail below.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one of one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

Figure 5:
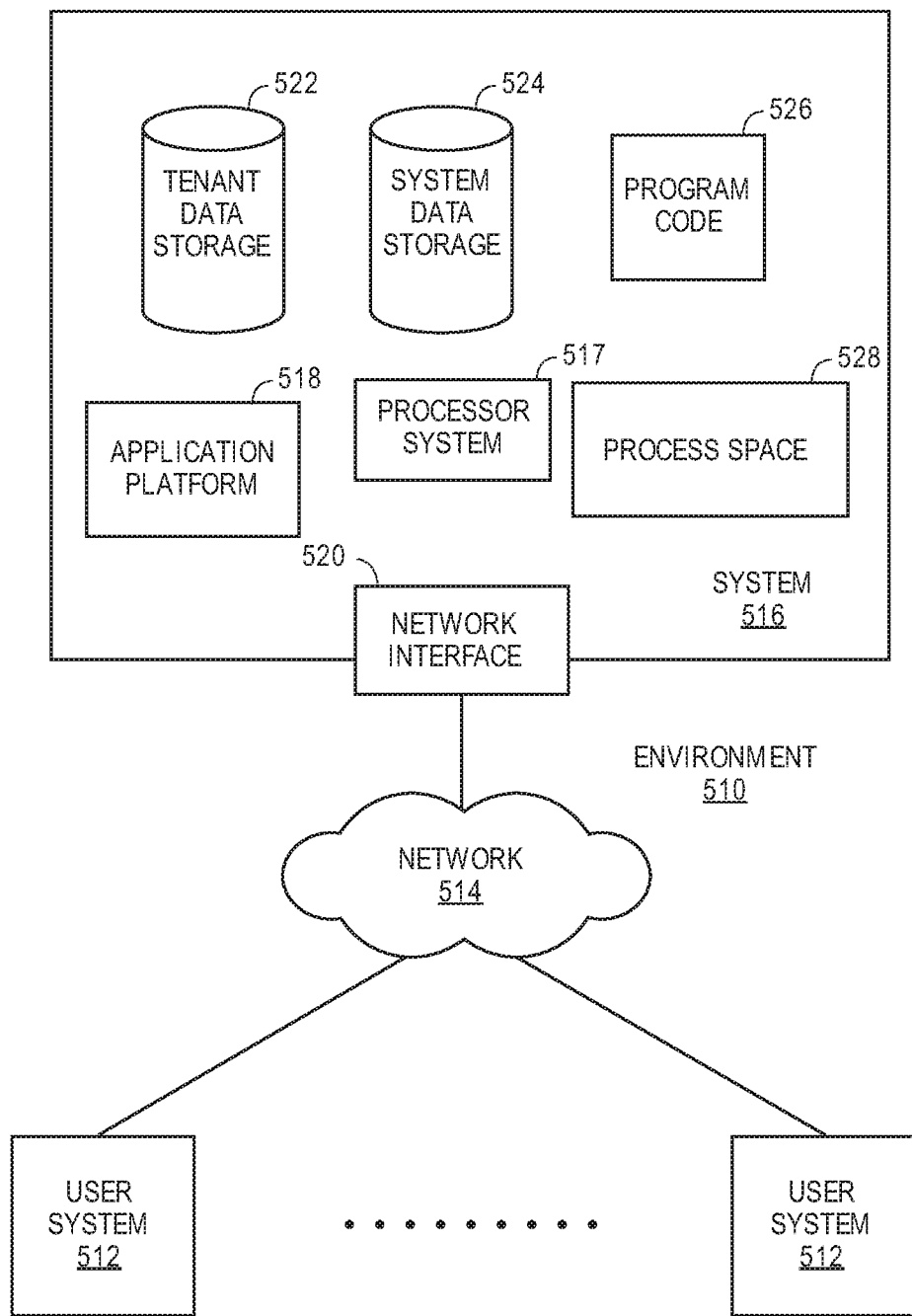
FIG. 5 illustrates a block diagram of an environment where an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in herein FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
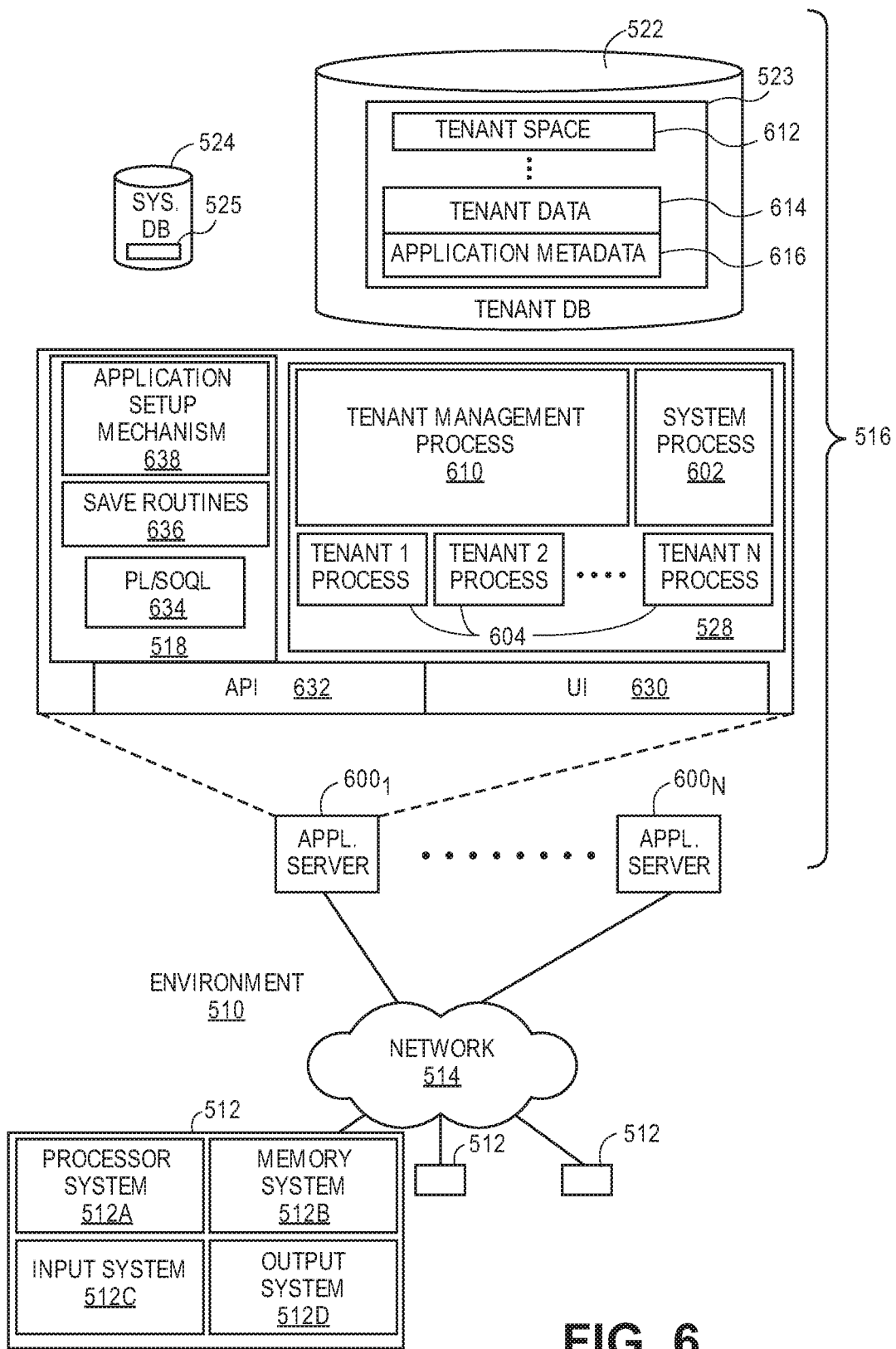
FIG. 6 illustrates a more detailed block diagram of an environment where an on-demand database service might be used.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1\text{-}400_N$, system process space 602, tenant process spaces 604, tenant management process space 610, tenant storage space 612, tenant data 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage spaces 612, which can be either a physical arrangement and/or a logical arrangement of data. Within each tenant storage space 612, tenant data 614 and application metadata 616 might be similarly allocated for each user. For example, a copy of a user's most recently used (MRU) items might be stored to tenant data 614. Similarly, a copy of MRU items for an entire organization that is a tenant might be stored to tenant storage space 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 5,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server 600$_1$ might be coupled via the network 514 (e.g., the Internet), another application server 600$_{N-1}$ might be coupled via a direct network link, and another application server 600$_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
   at least one memory device; and one or more processors coupled with the at least one memory device, the one or more processors to:

receive database statement data from a plurality of client threads executed by the one or more processors, cause the database statement data to be stored in a plurality of chunks maintained in an in-use list, the in-use list having a chunk for individual use by the corresponding client threads, cause chunks in the in-use list to be moved to a completed queue when a chunk in the in-use list is substantially full, cause a chunk from a free list to be placed in the in-use list to replace removed chunks, cause the chunks from the completed queue to be stored in the at least one memory device.

2. The system of claim 1 further comprising a plurality of service processes/threads to receive the database statement data from instrumentation points and cause the database statement data to be stored in the chunks in the in-use list.

3. The system of claim 1 wherein the chunks in the completed queue are periodically moved to a processing queue by and chunks from the processing queue are stored in the at least one memory device.

4. The system of claim 1 wherein the plurality of client threads comprise threads corresponding to multiple tenants within a multitenant environment.

5. The system of claim 2, wherein, to provide database statement monitoring, chunks corresponding to a particular service processes/threads are stored in private memory corresponding to the particular service processes/threads and chunks are managed in a round robin fashion.

6. The system of claim 2, wherein, chunks are stored in a shared memory that is shared by multiple service processes/threads.

7. The system of claim 1 wherein database statement data comprises details captured by a software product corresponding to a selected client thread.

8. A method to provide trace database statement monitoring functionality, the method comprising:

receiving database statement data from a plurality of client threads executed by one or more processors;

causing the database statement data to be stored in a plurality of chunks maintained in an in-use list, the in-use list having a chunk for individual use by the corresponding client threads;

causing chunks in the in-use list to be moved to a completed queue when a chunk in the in-use list is substantially full;

causing a chunk from a free list to be placed in the in-use list to replace removed chunks; and causing the chunks from the completed queue to be stored in at least one memory device.

9. The method of claim 8 wherein a plurality of service processes/threads receive the database statement data from instrumentation points and cause the database statement data to be stored in the chunks in the in-use list.

10. The method of claim 8 wherein the chunks in the completed queue are periodically moved to a processing queue and chunks from the processing queue are stored in the at least one memory device.

11. The method of claim 8 wherein the plurality of client threads comprise threads corresponding to multiple tenants within a multitenant environment.

12. The method of claim 8, wherein, to provide database statement monitoring, chunks corresponding to a particular service processes/threads are stored in private memory corresponding to the particular service processes/threads and chunks are managed in a round robin fashion.

13. The method of claim 8, wherein chunks are stored in a shared memory that is shared by multiple service processes/threads.

14. The method of claim 8 wherein database statement data comprises details captured by a software product corresponding to a selected client thread.

15. A non-transitory computer-readable medium having stored thereon instructions that, when executed by one or more processors, cause the one or more processors to:

receive database statement data from a plurality of client threads executed by the one or more processors;

cause the database statement data to be stored in a plurality of chunks maintained in an in-use list, the in-use list having a chunk for individual use by the corresponding client threads;

cause chunks in the in-use list to be moved to a completed queue when a chunk in the in-use list is substantially full;

cause a chunk from a free list to be placed in the in-use list to replace removed chunks;

cause the chunks from the completed queue to be stored in at least one memory device.

16. The non-transitory computer-readable medium of claim 15 further comprising instructions that, when executed by the one or more processors, cause a plurality of service processes/threads to receive the database statement data from instrumentation points and cause the database statement data to be stored in the chunks in the in-use list.

17. The non-transitory computer-readable medium of claim 15 wherein the chunks in the completed queue are periodically moved to a processing queue and chunks from the processing queue are stored in the at least one memory device.

18. The non-transitory computer-readable medium of claim 15 wherein the plurality of client threads comprise threads corresponding to multiple tenants within a multitenant environment.

19. The non-transitory computer-readable medium of claim 16, wherein, to provide database statement monitoring, chunks corresponding to a particular service processes/threads are stored in private memory corresponding to the particular service processes/threads and chunks are managed in a round robin fashion.

20. The non-transitory computer-readable medium of claim 16, wherein, chunks are stored in a shared memory that is shared by multiple service processes/threads.

21. The non-transitory computer-readable medium of claim 15 wherein database statement data comprises details captured by a software product corresponding to a selected client thread.

22. The system of claim 1 wherein the database statement data comprises one or more of memory usage for statement execution, processor usage for statement execution, storage capacity usage for statement execution and/or network usage for statement execution.

23. The method of claim 8 wherein the database statement data comprises one or more of memory usage for statement execution, processor usage for statement execution, storage capacity usage for statement execution and/or network usage for statement execution.

24. The non-transitory computer-readable medium of claim 15 wherein the database statement data comprises one or more of memory usage for statement execution, processor usage for statement execution, storage capacity usage for statement execution and/or network usage for statement execution.

\* \* \* \* \*